US012614505B2

(12) United States Patent
Kim

(10) Patent No.: US 12,614,505 B2
(45) Date of Patent: Apr. 28, 2026

(54) DISPLAY DEVICE HAVING AMPLIFIERS IN PARALLEL BETWEEN CHANNEL AND OUTPUT LINES, AND DRIVING METHOD THEREOF, AND ELECTRONIC DEVICE INCLUDING THE DISPLAY DEVICE

(71) Applicant: Samsung Display Co., Ltd., Yongin-Si (KR)

(72) Inventor: Sang Kuk Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/771,268

(22) Filed: Jul. 12, 2024

(65) Prior Publication Data

US 2025/0029549 A1 Jan. 23, 2025

(30) Foreign Application Priority Data

Jul. 18, 2023 (KR) ........................ 10-2023-0093217

(51) Int. Cl.
*G09G 3/32* (2016.01)
*G09G 3/3266* (2016.01)
(Continued)

(52) U.S. Cl.
CPC ............. *G09G 3/32* (2013.01); *G09G 3/3266* (2013.01); *G09G 3/3275* (2013.01);
(Continued)

(58) Field of Classification Search
CPC ...... G09G 3/32; G09G 3/3266; G09G 3/3275; G09G 3/3688; G09G 2310/0267;
(Continued)

(56) References Cited

U.S. PATENT DOCUMENTS 5,526,014 A * 6/1996 Shiba ................... G09G 3/3688
345/98
6,970,152 B1 * 11/2005 Bell ..................... G09G 3/3688
345/55
(Continued)

FOREIGN PATENT DOCUMENTS

JP 11249633 A * 9/1999
JP 2002156935 A * 5/2002
(Continued)

OTHER PUBLICATIONS

Adnan Kiayani et al., "Digital Mitigation of Transmitter-Induced Receiver Desensitization in Carrier Aggregation FDD Transceivers", IEEE Transactions on Microwave Theory and Techniques, vol. 63, No. 11, Nov. 2015, 16 pages.

*Primary Examiner* — Adam J Snyder

(74) *Attorney, Agent, or Firm* — Innovation Counsel LLP

(57) ABSTRACT

An embodiments of the present disclosure provides a display device including: pixels disposed to be connected to scan lines and data lines; and a data driver configured to supply a data signal to the data lines via output lines. The data driver includes: a signal generator configured to generate the data signal to supply the data signal to channel lines; and a first amplifier and a second amplifier connected in parallel between each of the channel lines and each of the output lines.

15 Claims, 12 Drawing Sheets

(51) Int. Cl.
*G09G 3/3275* (2016.01)
*G09G 3/36* (2006.01)

(52) U.S. Cl.
CPC ... *G09G 3/3688* (2013.01); *G09G 2310/0267* (2013.01); *G09G 2310/027* (2013.01); *G09G 2310/0275* (2013.01); *G09G 2310/0291* (2013.01); *G09G 2310/08* (2013.01); *G09G 2330/021* (2013.01)

(58) Field of Classification Search
CPC ..... G09G 2310/0275; G09G 2330/021; G09G 2310/027; G09G 2310/0291; G09G 2310/08
See application file for complete search history.

(56) References Cited

U.S. PATENT DOCUMENTS

| | | | | |
|---|---|---|---|---|
| 8,248,351 | B2 * | 8/2012 | Miyazaki | G09G 3/3688 345/98 |
| 2004/0125067 | A1 * | 7/2004 | Kim | G09G 3/3696 345/98 |
| 2006/0109228 | A1 * | 5/2006 | Kang | G09G 3/3688 345/98 |
| 2013/0241901 | A1 * | 9/2013 | Bae | G09G 3/3614 345/204 |

FOREIGN PATENT DOCUMENTS

| | | | | |
|---|---|---|---|---|
| KR | 1020200070654 | A | 6/2020 | |
| NL | 1022334 | C2 * | 7/2004 | G09G 3/3688 |

* cited by examiner

DISPLAY DEVICE HAVING AMPLIFIERS IN PARALLEL BETWEEN CHANNEL AND OUTPUT LINES, AND DRIVING METHOD THEREOF, AND ELECTRONIC DEVICE INCLUDING THE DISPLAY DEVICE

CROSS-REFERENCE TO RELATED APPLICATION

This application claims priority to and the benefit of Korean Patent Application No. 10-2023-0093217 filed in the Korean Intellectual Property Office on Jul. 18, 2023, the entire contents of which are incorporated herein by reference.

BACKGROUND

(A) Field

The present disclosure relates to a display device and a driving method thereof, and an electronic device including the display device.

(B) Description of the Related Art

As information technology has developed, importance of a display device, which is a connection medium between a user and information, has been highlighted. Accordingly, the use of display devices such as a liquid crystal display device, an organic light emitting display device, and the like has been increasing.

The display device includes pixels, and the pixels may display a predetermined image in response to a data signal. To this end, the display device may include a data driver for supplying data signals to data lines connected to pixels via output lines. The data driver has an amplifier connected to each output line, and the amplifier may be pre-charged before outputting a data signal.

An electronic device (for example, a portable electronic device) including a display device includes an antenna for short-range and/or long-range wireless communication. During a period in which the amplifier of the data driver is pre-charged, the output lines may be set to a floating state. When the output lines are periodically floated, intermodulation noise may be generated in the communication band of the antenna.

SUMMARY

The present disclosure has been made in an effort to provide a display device and a driving method thereof that may minimize intermodulation noise, and an electronic device including the display device.

An embodiments of the present disclosure provides a display device including: pixels disposed to be connected to scan lines and data lines; and a data driver configured to supply a data signal to the data lines via output lines. The data driver includes: a signal generator configured to generate the data signal to supply the data signal to channel lines; and a first amplifier and a second amplifier connected in parallel between each of the channel lines and each of the output lines.

The first amplifier and the second amplifier disposed in an i-th channel, where i is an integer greater than or equal to 0, may be alternately connected to an i-th output line.

The data driver may further include: a first transistor connected between the first amplifier and the i-th output line; a second transistor connected between the first amplifier and the i-th channel line; a third transistor connected between the second amplifier and the i-th output line; and a fourth transistor connected between the second amplifier and the i-th channel line.

The first transistor and the third transistor may be alternately turned on, and the second transistor and the fourth transistor may be alternately turned on.

The second transistor may be turned on before the first transistor, and a turned-on period of the second transistor may partially overlap a turned-on period of the first transistor.

The fourth transistor may be turned on before the third transistor, and a turned-on period of the fourth transistor may partially overlap a turned-on period of the third transistor.

The data driver may further include a third amplifier connected in parallel to the first amplifier and the second amplifier between each of the channel lines and each of the output lines.

The first amplifier, the second amplifier, and the third amplifier disposed in an i-th channel, where i is an integer greater than or equal to 0, may be alternately connected to an i-th output line.

The data driver may further: include a first transistor connected between the first amplifier and the i-th output line; a second transistor connected between the first amplifier and the i-th channel line; a third transistor connected between the second amplifier and the i-th output line; a fourth transistor connected between the second amplifier and the i-th channel line; a fifth transistor connected between the third amplifier and the i-th output line; and a sixth transistor connected between the third amplifier and the i-th channel line.

The first transistor, the third transistor, and the fifth transistor may be alternately turned on; and the second transistor, the fourth transistor, and the sixth transistor may be alternately turned-on.

The second transistor may be turned on before the first transistor, and a turned-on period of the second transistor may partially overlap a turned-on period of the first transistor. The fourth transistor may be turned on before the third transistor, and a turned-on period of the fourth transistor may partially overlap a turned-on period of the third transistor. The sixth transistor may be turned on before the fifth transistor, and a turned-on period of the sixth transistor may partially overlap a turned-on period of the fifth transistor.

An embodiment provides a display device including: pixels disposed to be connected to scan lines and data lines; a data driver configured to supply a data signal to the data lines via output lines, wherein the data driver includes a signal generator configured to generate the data signal to supply the data signal to channel lines; and a first amplifier and an auxiliary amplifier connected in series between each of the channel lines and each of the output lines.

An input terminal of the first amplifier disposed in an i-th channel, where i is an integer greater than or equal to 0, may be connected to an i-th channel line, and an output terminal of the auxiliary amplifier may be connected to an i-th output line.

The display device may further include a first transistor disposed in the i-th channel, connected between an output terminal of the first amplifier and an input terminal of the auxiliary amplifier, and turned on during a portion of a horizontal period.

An embodiment provides a driving method of a display device, including: generating data signals corresponding to grayscales of data in a signal generator receiving the data; and supplying the data signals to data lines via output lines from an output portion connected to the signal generator, wherein an i-th channel, where i is an integer greater than or equal to 0, of the output portion includes a plurality of amplifiers, and the amplifiers are alternately connected to an i-th output line.

The amplifiers may be connected to the i-th output line while alternating based on a horizontal period.

Each of the amplifiers may be electrically connected to the i-th output line after being pre-charged by a data signal supplied from the signal generator.

An embodiment provides an electronic device including: a display module configured to display a predetermined image; and a processor configured to supply data corresponding to the image to the display module. The display module includes: a display panel displaying the image; a gate driver configured to supply a scan signal to the display panel; and a source driver configured to supply a data signal to the display panel. Each channel of the source driver outputting the data signal includes a plurality of amplifiers.

The plurality of amplifiers may alternately output the data signal.

The plurality of amplifiers may output the data signal while alternating based on a horizontal period.

Features of the present disclosure are not limited to the features mentioned above, and other technical features that are not mentioned may be clearly understood to a person of an ordinary skill in the art using the following description.

According to the display device and the driving method thereof, and the electronic device including the display device according to the embodiments of the present disclosure, the output lines of the data driver are always connected to the amplifier, and thus intermodulation noise may be minimized.

However, the effects of the present disclosure are not limited to the above-described effects, and may be variously extended without departing from the spirit and scope of the present disclosure.

DETAILED DESCRIPTION OF THE EMBODIMENTS

Figure 1:
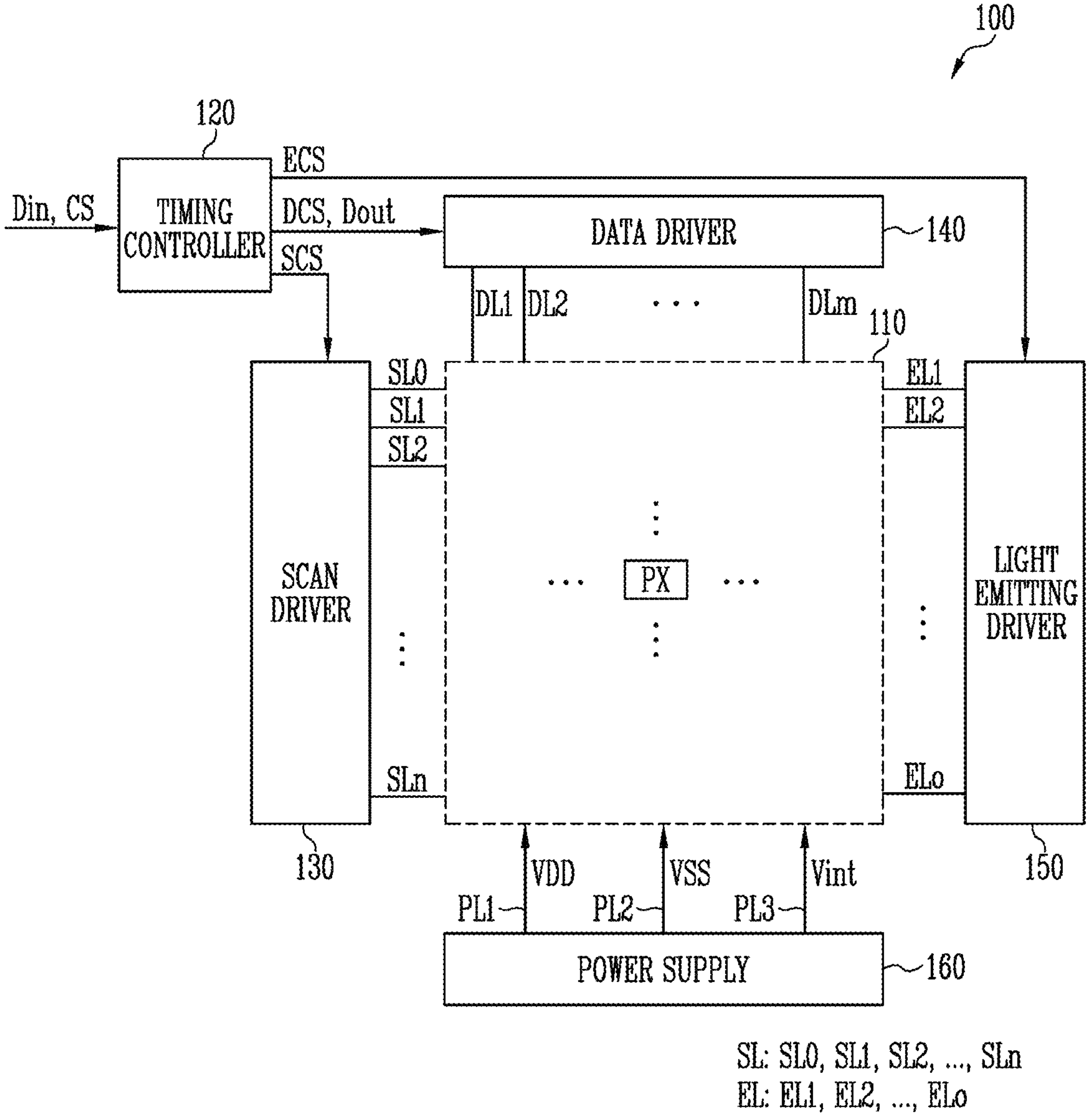
FIG. 1 illustrates a display device according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts or portions that are irrelevant to the description are omitted, and identical or similar constituent elements throughout the specification are denoted by the same reference numerals. Therefore, the above-mentioned reference numerals may be used in other drawings.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas, etc. may be exaggerated for clarity.

In addition, the expression "equal to or the same as" in the description may mean "substantially equal to or the same as". That is, it may be the same enough to convince those skilled in the art to be the same. Even other expressions may be expressions from which "substantially" is omitted.

Some embodiments are described in the accompanying drawings in relation to functional blocks, units, and/or modules. Those skilled in the art will understand that these blocks, units, and/or modules are physically implemented by logic circuits, discrete components, microprocessors, hard-wired circuits, memory elements, wire connections, and other electronic circuits. These can be formed by using semiconductor-based manufacturing techniques or other manufacturing techniques. In the case of the blocks, units, and/or modules being implemented by microprocessors or other similar hardware, they may be programmed and controlled by using software to perform various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions. In addition, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

"Connection" between two elements may comprehensively mean both electrical and physical connections, but is not necessarily limited thereto. For example, "connection" used based on a circuit diagram may mean an electrical connection, and "connection" used based on a cross-sectional view and a top plan view may mean a physical connection.

Although the terms "first", "second", and the like are used to describe various constituent elements, these constituent elements are not limited by these terms. These terms are used only to distinguish one constituent element from another constituent element. Therefore, the first constituent elements described below may be the second constituent elements within the technical spirit of the inventive concept.

However, the inventive concept is not limited to the embodiments disclosed hereinafter and may be implemented in various forms. In addition, each embodiment disclosed below may be implemented alone, or may be implemented in combination with at least one other embodiment.

FIG. 1 illustrates a display device 100 according to an embodiment of the present disclosure.

Referring to FIG. 1, the display device 100 according to an embodiment may include a pixel portion 110 (or a panel), a timing controller 120, a scan driver 130, a data driver 140, a light emitting driver 150, and a power supply 160. The above-described components may be implemented as separate integrated circuits, and two or more of the above-described components may be integrated and implemented into one integrated circuit. In addition, the scan driver 130 and/or the light emitting driver 150 may be formed in the pixel portion 110.

The pixel portion 110 may include pixels PX connected to scan lines SL including scan lines SL0, SL1, SL2, . . . , SLn, data lines DL1, DL2, . . . , DLm, light emitting control lines EL including light emitting lines EL1, EL2, . . . , ELo, and power lines PL1, PL2, and PL3, where n, m, and o are integers greater than or equal to 2.

The pixels PX may be selected in units of horizontal lines (for example, pixels PX connected to the same scan line may be classified into one horizontal line (or pixel row)) when a scan signal is supplied to the scan lines SL0 to SLn, and the pixels PX selected by the scan signal may receive a data signal from one of the data lines DL1 to DLm connected thereto. The pixels PX receiving the data signal may generate light having a predetermined luminance in response to a voltage of the data signal.

The scan driver 130 may receive a scan driving signal SCS from the timing controller 120. The scan driving signal SCS may include at least one scan start signal and clock signals necessary for driving the scan driver 130. The scan driver 130 may generate a scan signal while shifting a scan start signal in response to a clock signal. The scan signal may be set to a gate-on voltage so that transistors included in the pixels PX may be turned on.

For example, a low level scan signal may be supplied to a P-type transistor, and a high level scan signal may be supplied to an N-type transistor. A transistor receiving a scan signal may be turned on in response to the scan signal. Thereafter, supplying the scan signal may mean that the gate-on voltage is supplied to the scan line SL. While, not supplying the scan signal may mean that the gate-off voltage is supplied to the scan line SL.

The data driver 140 may receive output data Dout and a data driving signal DCS from the timing controller 120. The data driving signal DCS may include a sampling signal and/or timing signals necessary for driving the data driver 140. The data driver 140 may generate a data signal based on the data driving signal DCS and the output data Dout. For example, the data driver 140 may generate an analog data signal based on a grayscale of the output data Dout. The data driver 140 may supply a data signal in units of horizontal periods.

The light emitting driver 150 may receive a light emitting driving signal ECS from the timing controller 120. The light emitting driving signal ECS may include a light emitting start signal and clock signals necessary for driving the light emitting driver 150. The light emitting driver 150 may generate a light emitting control signal while shifting a light emitting start signal in response to a clock signal. The light emitting control signal may be set to a gate-off voltage so that transistors included in the pixel PX may be turned off.

For example, a light emitting control signal supplied to a P-type transistor may be set to a high level, and a light emitting control signal supplied to an N-type transistor may be set to a low level. A transistor receiving the light emitting control signal may be turned off in response to the light emitting control signal. Thereafter, supplying the light emitting control signal may mean that the gate-off voltage is supplied to the light emitting control line EL. While, not supplying the emitting control signal may mean that the gate-on voltage is supplied to the emitting control line EL.

The timing controller 120 may receive input data Din and a control signal CS from a host system through an interface. For example, the timing controller 120 may receive the input data Din and the control signal CS from at least one of a graphics processing unit (GPU), a central processing unit (CPU), and an application processor (AP) included in the host system. The control signal (CS) may include various signals including a clock signal.

The timing controller 120 may generate the scan driving signal SCS, the data driving signal DCS, and the light emitting driving signal ECS based on the control signal CS. The scan driving signal SCS, the data driving signal DCS, and the light emitting driving signal ECS may be supplied to the scan driver 130, the data driver 140, and the light emitting driver 150, respectively.

The timing controller 120 may rearrange the input data Din according to specifications of the display device 100. In addition, the timing controller 120 may correct the input data Din to generate the output data Dout, and may supply the output data Dout to the data driver 140. In the embodiment, the timing controller 120 may correct the input data Din in response to an optical measurement result measured during a process.

The power supply 160 may generate various power sources required to drive the display device 100. For example, the power supply 160 may generate a first driving power source VDD, a second driving power source VSS, and an initialization power source Vint.

The first driving power source VDD may be a power source supplying a driving current to the pixels PX. The second driving power source VSS may be a power source receiving a driving current from the pixels PX. The initialization power source Vint may be a power source that initializes a gate electrode of a driving transistor included in each pixel PX. During a period in which the pixels PX are set to a light emitting state, the first driving power source VDD may be set to a higher voltage than the second driving power source VSS.

The first driving power source VDD generated by the power supply 160 may be supplied to a first power line PL1, the second driving power source VSS may be supplied to a second power line PL2, and the initialization power source Vint may be supplied to a third power line PL3. The first power line PL1, the second power line PL2, and the third power line PL3 may be commonly connected to the pixels PX, but embodiments of the present disclosure are not limited thereto.

In an embodiment, the first power line PL1 includes a plurality of power lines, and the plurality of power lines may be connected to different pixels PX. In an embodiment, the second power line PL2 includes a plurality of power lines, and the plurality of power lines may be connected to different pixels PX. In an embodiment, the third power line PL3 includes a plurality of power lines, and the plurality of power lines may be connected to different pixels PX. That is, in an embodiment of the present disclosure, the pixels PX may be connected to one of the first power lines PL1, one of the second power lines PL2, and one of the third power lines PL3.

Figure 2:
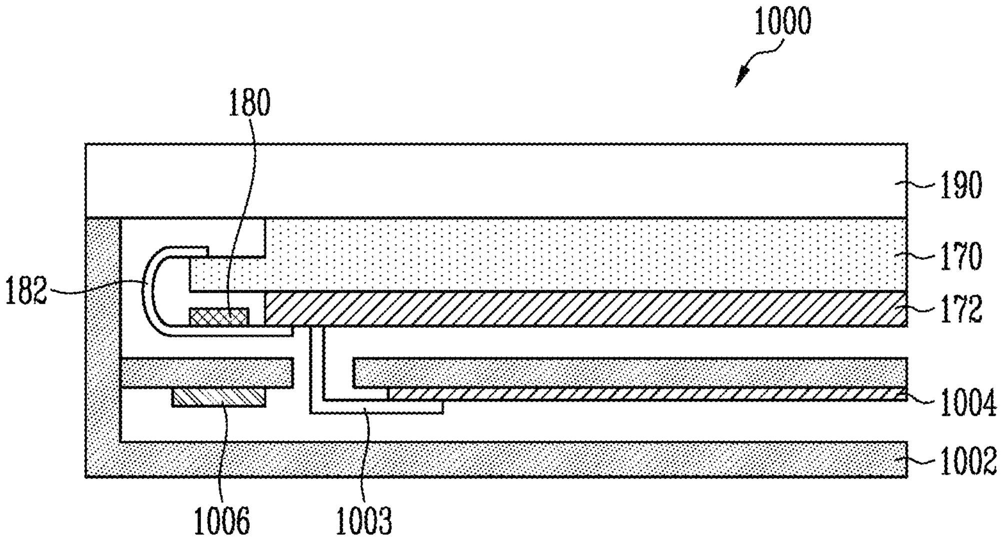
FIG. 2 schematically illustrates an electronic device including a display device.

FIG. 2 schematically illustrates an electronic device 1000 including a display device.

Referring to FIG. 2, the electronic device 1000 may include a housing 1002, a window 190, a panel 170, a first flexible circuit board 172, a second flexible circuit board 1004, an antenna module 1006, a driving integrated circuit (IC) 180, a first connection portion 182, and a second connection portion 1003.

The housing 1002 may provide a predetermined accommodation space so that various components may be disposed. The housing 1002 may be coupled to the window 190. The window 190 may be disposed in front of the housing 1002. The housing 1002 may be coupled to the window 190 to provide a predetermined accommodation space.

The housing 1002 may include a material with relatively high rigidity. For example, the housing 1002 may include a plurality of frames and/or plates made of glass, plastic, or metal, or a combination thereof. The housing 1002 may stably protect components accommodated in an internal space from external impact.

The window 190 may cover an entire outer side of the panel 170 of the electronic device 1000. The window 190 may have a shape corresponding to the panel 170. The window 190 may include an optically transparent insulating material. For example, the window 190 may be a glass substrate or a polymer substrate. For example, the window 190 may be a tempered glass substrate.

The panel 170 may include the pixel portion 100, the scan driver 130, and the light emitting driver 150 shown in FIG. 1. The panel 170 may further include a component for generating an image and detecting an input applied from the outside. To this end, the panel 170 may include a display layer and a sensor layer.

The first flexible circuit board 172 may be electrically connected to the driving IC 180. For example, the driving IC 180 may be mounted on the first flexible circuit board 172. In this case, the first flexible circuit board 172 may be referred to as a chip on film (CoF).

The driving IC 180 may supply various signals necessary for driving the panel 170. For example, the driving IC 180 may generate a data signal and supply it to the panel 170. In this case, the driving IC 180 may include the data driver 140, e.g., see FIG. 1. The driving IC 180 may further include the timing controller 120, e.g., see FIG. 1. The driving IC 180 includes at least one or more components shown in FIG. 1, and may supply various signals (for example, signals SCS and ECS) including data signals to the panel 170.

The driving IC 180 may be electrically connected to the panel 170 through the first connection portion 182. The first connection portion 182 includes a bending area, and may electrically connect the driving IC 180 and the panel 170 via the bending area. The first connection portion 182 may be a flexible circuit board.

The second flexible circuit board 1004 may include various components included in the host system. For example, the second flexible circuit board 1004 may include at least one of the GPU, the CPU, and the AP. The second flexible circuit board 1004 may be electrically connected to the first flexible circuit board 172 via the second connection portion 1003. The second flexible circuit board 1004 may supply the input data Din and the control signal CS to the driving IC 180 via the first flexible circuit board 172.

The antenna module 1006 may perform wireless communication of the electronic device 1000, for example, short-range and/or long-range wireless communication. For example, the antenna module 1006 may perform wireless communication using a predetermined transmission band frequency and reception band frequency. The antenna module 1006 described above may be attached to the housing 1002 and disposed adjacent to the driving IC 180.

Meanwhile, since the antenna module 1006 is disposed adjacent to the driving IC 180, when the output line of the data driver 140 is periodically floated, intermodulation noise may occur in the communication band of the antenna.

Figure 3:
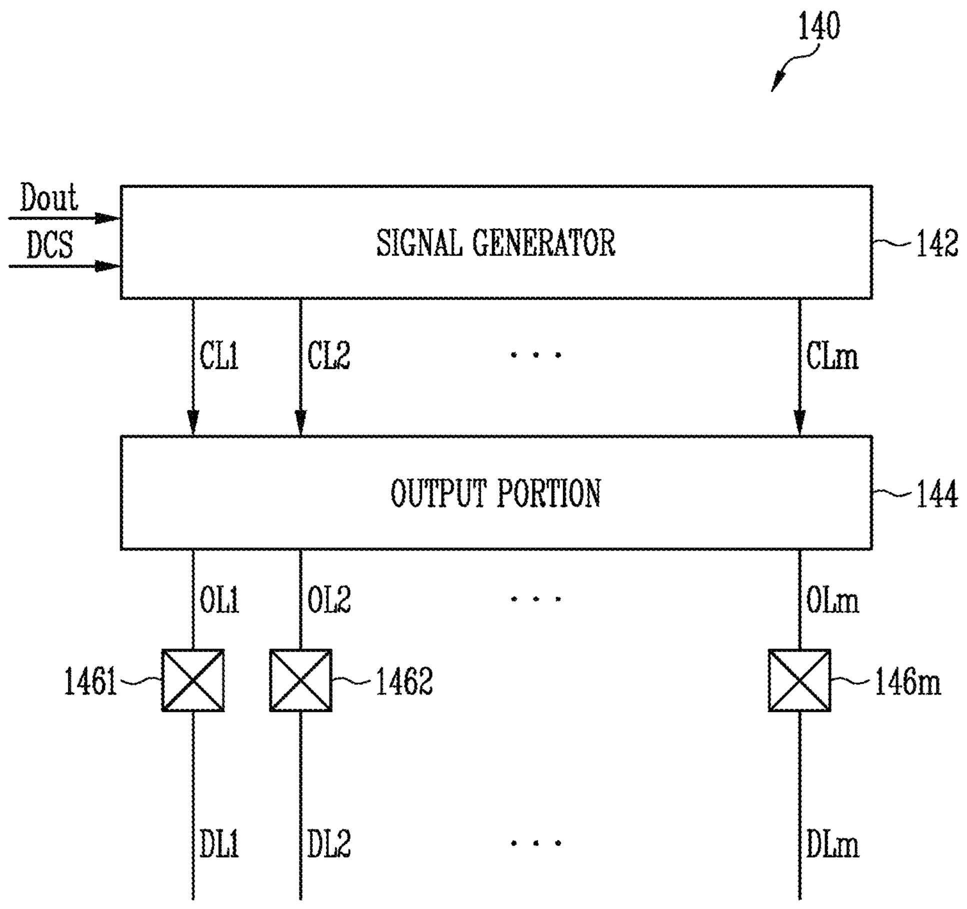
FIG. 3 illustrates an example of a data driver according to an embodiment of the present disclosure.

FIG. 3 illustrates an example of a data driver 140 according to an embodiment of the present disclosure.

Referring to FIG. 3, the data driver 140 according to the embodiment of the present disclosure may include a signal generator 142 and an output portion 144.

The signal generator 140 may receive the output data Dout and the data driving signal DCS from the timing controller 120, e.g., see FIG. 1. The signal generator 140 may sequentially store the output data Dout in response to the data driving signal DCS and generate a data signal using the stored output data Dout. To this end, the signal generator 140 may include latches and digital analog converters. For example, the signal generator 140 includes a plurality of channels, and may include a latch and a digital analog converter for each channel.

The signal generator 140 may be connected to the output portion 144 via channel lines CL1, CL2, . . . , CLm. A data signal generated by the signal generator 140 may be supplied to the output portion 144 via the channel lines CL1 to CLm.

The output portion 144 may supply data signals to output lines OL1, OL2, . . . , OLm disposed for each channel. To this end, the output portion 144 may have at least one amplifier disposed for each channel. Each of the amplifiers may be pre-charged when a data signal is supplied to the channel line (one channel line of the channel lines CL1 to CLm) to which it is connected, and may supply the voltage of the pre-charged data signal to the output line (one output line of the output lines OL1 to OLm) connected to it. For example, each of the amplifiers may amplify the data signal supplied from the channel line (one channel line of the channel lines CL1 to CLm) and supply it to the output line (one output line of the output lines OL1 to OLm).

The output lines OL1 to OLm may be electrically connected to the data lines DL1 to DLm at junctions 1461, 1462, . . . , 146*m*. For example, the first output line OL1 may be electrically connected to the first data line DL1 at the first junction 1461. For example, the m-th output line OLm may be electrically connected to the m-th data line DLm at the m-th junction 146*m*. For example, the junctions 1461 to 146*m* may be configured of pads or the like.

Figure 4:
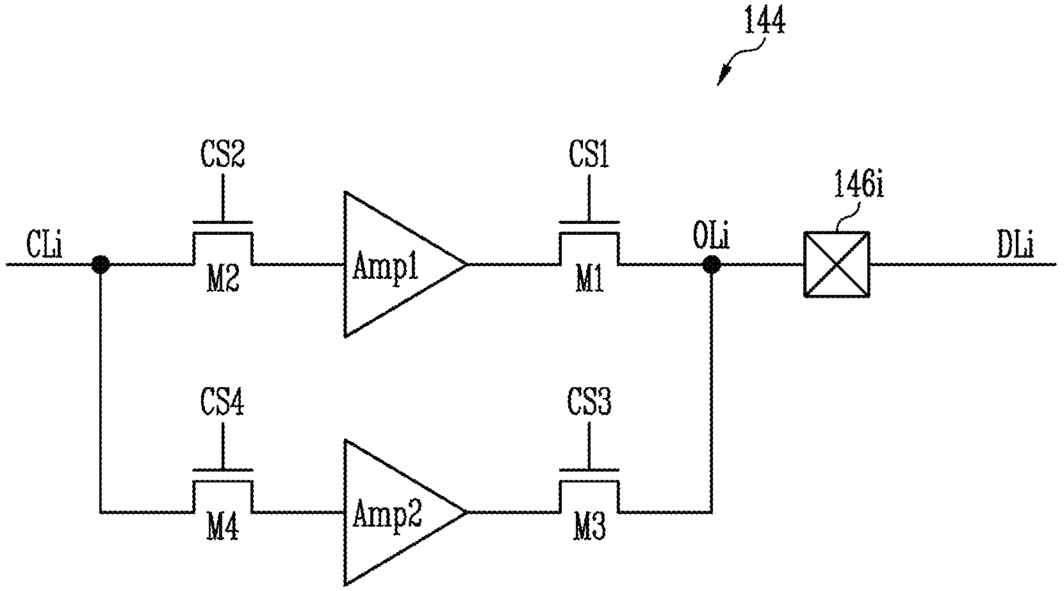
FIG. 4 illustrates an example of an output portion shown in FIG. 3.

FIG. 4 illustrates an example of the output portion 144 shown in FIG. 3. In FIG. 4, an i-th channel, where i is an integer greater than or equal to 0, of the output portion 144 is shown. Configurations of other channels included in the output portion 144 may also be substantially the same as the i-th channel.

Referring to FIG. 4, the channel of the output portion 144 may include a first transistor M1, a second transistor M2, a third transistor M3, a fourth transistor M4, a first amplifier Amp1, and a second amplifier Amp2.

The first transistor M1 to the fourth transistor M4 may be turned on when control signals CS1, CS2, CS3, and CS4 are supplied and turned off when the control signals CS1, CS2, CS3, and CS4 are not supplied. Here, supplying the control signals CS1 to CS4 means that the gate-on voltage is supplied to the gate electrodes of the transistors M1 to M4, and not supplying the control signals CS1 to CS4 means that the gate-off voltage is supplied to the gate electrodes of the transistors M1 to M4.

The first transistor M1 may be connected between the i-th output line OLi and the first amplifier Amp1. The first transistor M1 may be turned on when the first control signal CS1 is supplied and turned off when the first control signal CS1 is not supplied.

The second transistor M2 may be connected between the i-th channel line CLi and the first amplifier Amp1. The second transistor M2 may be turned on when the second control signal CS2 is supplied and turned off when the second control signal CS2 is not supplied.

An input terminal of the first amplifier Amp1 may be connected to the second transistor M2, and an output terminal of the first amplifier Amp1 may be connected to the first transistor M1. The first amplifier Amp1 may supply a data signal to the i-th data line DLi (or the i-th output line OLi).

The third transistor M3 may be connected between the i-th output line OLi and the second amplifier Amp2. The third transistor M3 may be turned on when the third control signal CS3 is supplied and turned off when the third control signal CS3 is not supplied.

The fourth transistor M4 may be connected between the i-th channel line CLi and the second amplifier Amp2. The fourth transistor M4 may be turned on when the fourth control signal CS4 is supplied and turned off when the fourth control signal CS4 is not supplied.

An input terminal of the second amplifier Amp2 may be connected to the fourth transistor M4, and an output terminal of the second amplifier Amp2 may be connected to the third transistor M3. The second amplifier Amp2 may supply a data signal to the i-th data line DLi (or the i-th output line OLi).

The first transistor M1, the first amplifier Amp1, and the second transistor M2 may be connected in series between the i-th channel line CLi and the i-th output line OLi. The third transistor M3, the second amplifier Amp2, and the fourth transistor M4 may be connected in series between the i-th channel line CLi and the i-th output line OLi. In this case, the third transistor M3, the second amplifier Amp2, and the fourth transistor M4 may be connected in parallel to the first transistor M1, the first amplifier Amp1, and the second transistor M2 between the i-th channel line CLi and the i-th output line OLi.

In the embodiment, the first amplifier Amp1 and the second amplifier Amp2 may alternately supply a data signal to the i-th data line DLi (or the i-th output line OLi). In the embodiment, the first amplifier Amp1 and the second amplifier Amp2 may supply a data signal to the i-th data line DLi while alternating every horizontal period.

Figure 5:
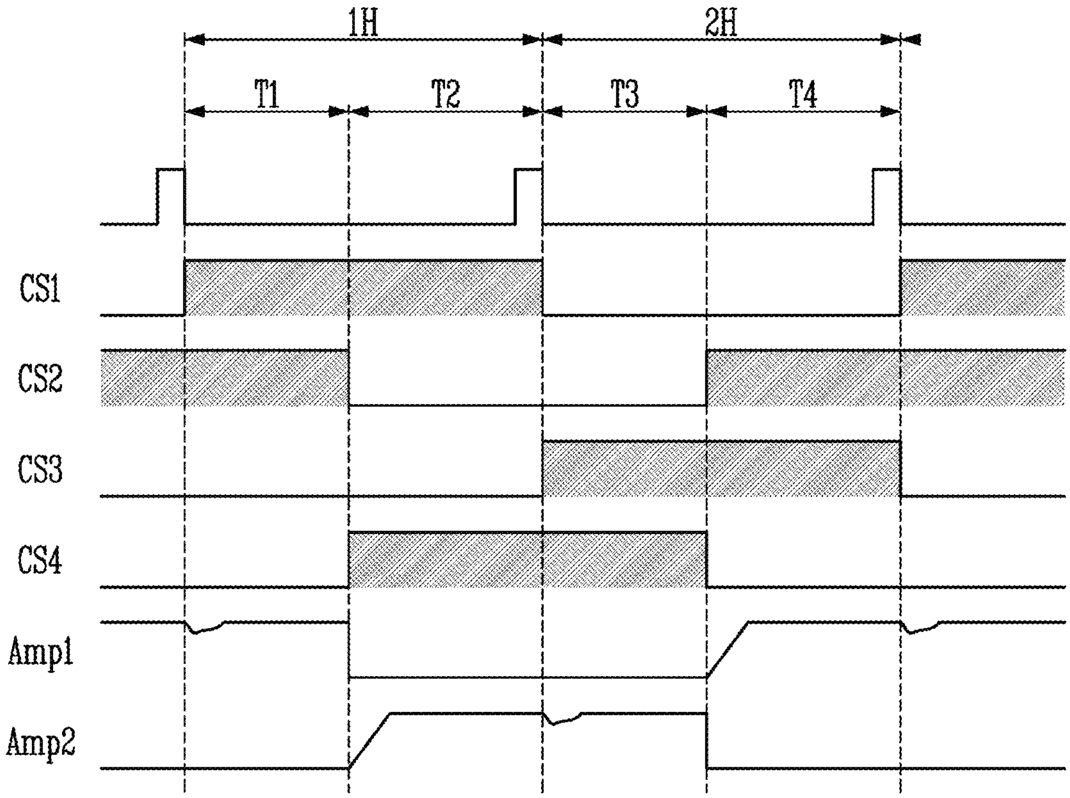
FIG. 5 illustrates a waveform diagram of an example of a driving method of the output portion shown in FIG. 4.

FIG. 5 illustrates a waveform diagram of an example of a driving method of an output portion shown in FIG. 4.

Referring to FIG. 5, in a first horizontal period 1H of two adjacent horizontal periods 1H and 2H, a data signal may be supplied from the first amplifier Amp1 to the data line DLi, and in the second horizontal period 2H, a data signal may be supplied from the second amplifier Amp2 to the data line DLi.

During a first period T1 of the first horizontal period 1H, the second control signal CS2 may be supplied to turn on the second transistor M2. The second transistor M2 may maintain a turned-on state even during a horizontal period prior to the first horizontal period 1H. When the second transistor M2 is turned on, the first amplifier Amp1 may be pre-charged.

During the first period T1 and a second period T2 of the first horizontal period 1H, the first control signal CS1 may be supplied to turn on the first transistor M1. When the first transistor M1 is turned on, the first amplifier Amp1 may be electrically connected to the data line DLi via the first transistor M1, the output line OLi, and the junction 146*i*. In this case, the first amplifier Amp1 may supply the data signal to the data line DLi.

Meanwhile, during the second period T2, the fourth control signal CS4 may be supplied to turn on the fourth transistor M4. When the fourth transistor M4 is turned on, the second amplifier Amp2 may be pre-charged by the voltage from the channel line CLi. That is, the second amplifier Amp2 is pre-charged before supplying the data signal to the data line DLi, and accordingly, the data signal voltage may be stably outputted. The fourth transistor M4 may maintain a turn-on state during a third period T3 of the second horizontal period 2H by the fourth control signal CS4.

During the third period T3 and a fourth period T4 of the second horizontal period 2H, the third control signal CS3 may be supplied to turn on the third transistor M3. When the third transistor M3 is turned on, the second amplifier Amp2 may be electrically connected to the data line DLi via the third transistor M3, the output line OLi, and the junction 146*i*. In this case, the second amplifier Amp2 may supply the data signal to the data line DLi.

During the fourth period T4 of the second horizontal period 2H, the second control signal CS2 is supplied to turn on the second transistor M2. When the second transistor M2 is turned on, the first amplifier Amp1 may be pre-charged by the voltage from the channel line CLi. That is, the first amplifier Amp1 is pre-charged before supplying the data signal to the data line DLi, and accordingly, the data signal voltage may be stably outputted.

In fact, the first amplifier Amp1 and the second amplifier Amp2 included in each channel of the output portion 144 may a supply data signal to the data line (one data line of the data lines DL1 to DLm) while repeating the above-described process.

The first transistor M1 and the third transistor M3 may be alternately turned on and off. To this end, the third control signal CS3 may have an opposite phase if it has the same cycle as the first control signal CS1. When the first transistor M1 and the third transistor M3 are alternately turned on and off, the output line OLi may be alternately connected to the first amplifier Amp1 or the second amplifier Amp2.

The second transistor M2 and the fourth transistor M4 may be alternately turned on and off. To this end, the fourth control signal CS4 may have an opposite phase if it has the same cycle as the second control signal CS2. When the second transistor M2 and the fourth transistor M4 are alternately turned on and off, the channel line CLi may be alternately connected to the first amplifier Amp1 or the second amplifier Amp2.

The second transistor M2 is turned on before the first transistor M1, and a turned-on period thereof may partially overlap that of the first transistor M1. The fourth transistor M4 is turned on before the third transistor M3, and a turned-on period thereof may partially overlap that of the third transistor M3.

Meanwhile, as described above, during the driving process of the display device 100, the output line OLi maintains a state connected to the first amplifier Amp1 or the second amplifier Amp2. That is, during the driving process of the display device 100, the output line OLi is not set to a floating state. When the output line OLi is not set to a floating state, intermodulation noise in the communication band of the antenna module 1006 may be minimized.

Meanwhile, in the outputs of the first amplifier Amp1 and the second amplifier Amp2 in FIG. 5, without considering the voltage of the data line DLi, only the voltages outputted from the first amplifier Amp1 and the second amplifier Amp2 are shown. For example, the output voltages of the first and second amplifiers Amp1 and Amp2 may not drop rapidly due to the voltage of the data line DLi.

Figure 6:
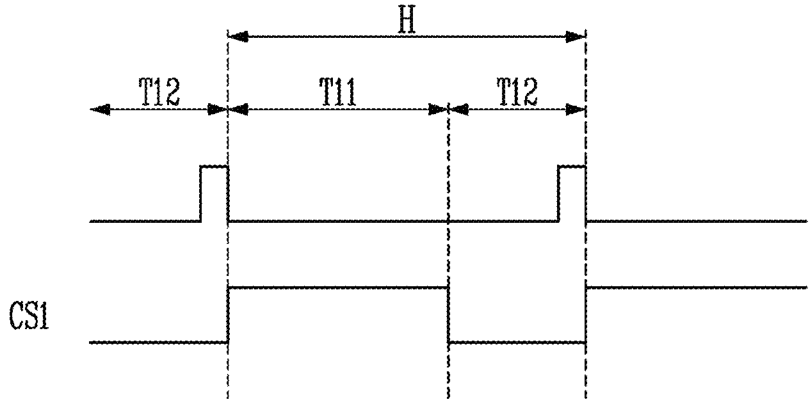
FIG. 6 illustrates a waveform diagram of a driving method of a comparative example.

FIG. 6 illustrates a waveform diagram of a driving method of a comparative example. In FIG. 6, the comparative example may mean a configuration in which the second transistor M2, the third transistor M3, the fourth transistor M4, and the second amplifier Amp2 are removed from the circuit of FIG. 4.

Referring to FIG. 6, first, the horizontal period H may be divided into an eleventh period T11 and a twelfth period T12 and driven.

During the twelfth period T12 before a specific horizontal period, the first amplifier Amp1 may be pre-charged by the voltage supplied from the channel line CLi. After the first amplifier Amp1 is pre-charged, the first control signal CS1 may be supplied to turn on the first transistor M1 during the eleventh period T11 of the specific horizontal period. When the first transistor M1 is turned on, a data signal from the first amplifier Amp1 may be supplied to the data line DLi via the output line OLi.

During the twelfth period T12 of the specific horizontal period, supply of the first control signal CS1 is stopped so that the first transistor M1 may be turned off. When the first transistor M1 is turned off, the output line OLi and the first amplifier Amp1 are electrically disconnected. During the twelfth period T12 of the specific horizontal period, the first amplifier Amp1 may be pre-charged by the voltage supplied from the channel line CLi. In the case of the comparative example, a data signal may be supplied to the data line DLi while repeating the above process.

Meanwhile, in the case of the comparative example, the output line OLi may be periodically (for example, in the twelfth period T12) set to a floating state. When the output line OLi is periodically set to the floating state, intermodulation noise may occur in the communication band of the antenna module 1006.

Figure 7:
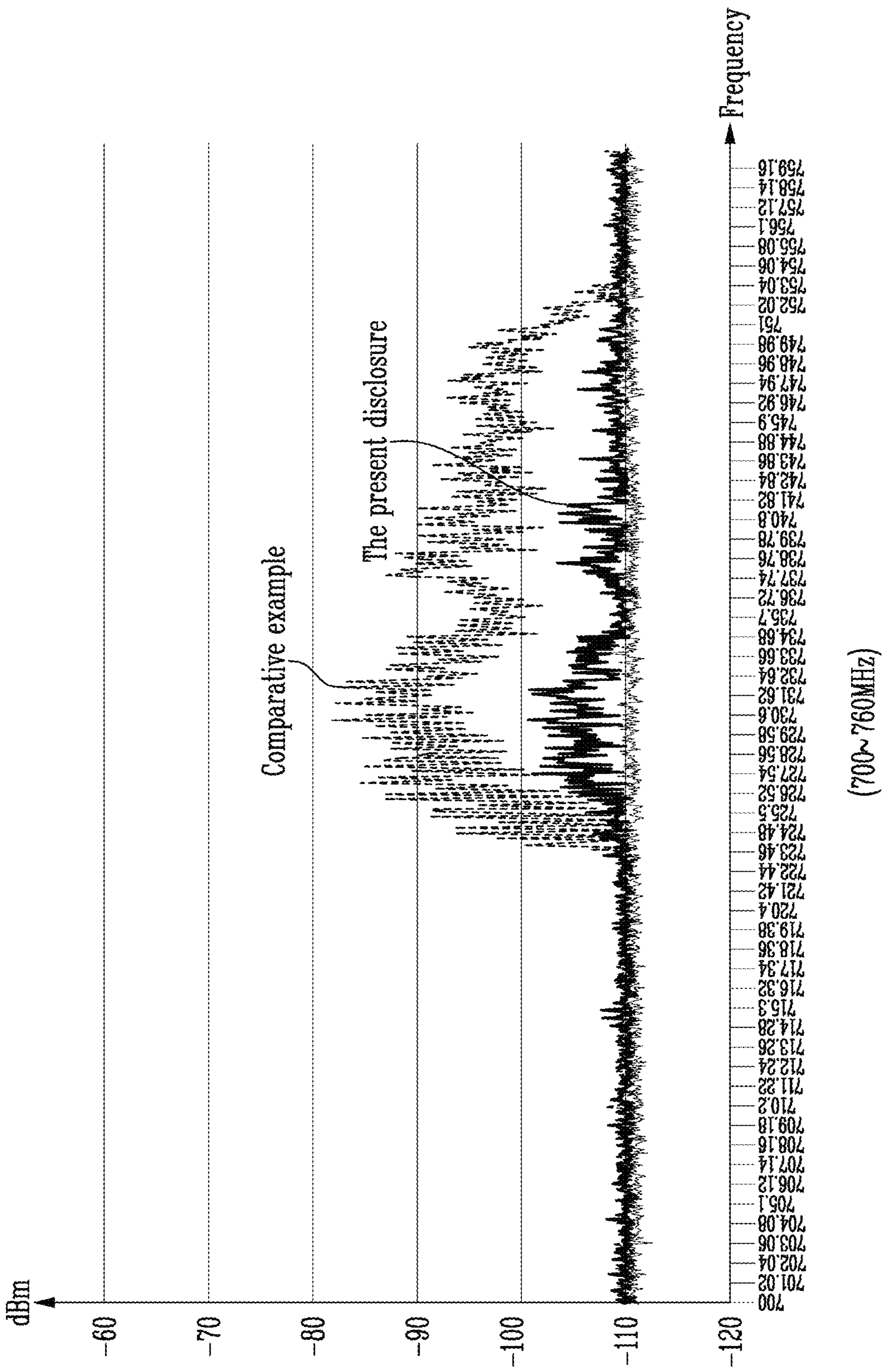
FIG. 7 illustrates intermodulation noises according to a comparative example and an embodiment of the present disclosure.

FIG. 7 illustrates intermodulation noises according to a comparative example and an embodiment of the present disclosure. In FIG. 7, an X-axis represents frequencies, and a Y-axis represents decibel milliwatts (dBm).

Referring to FIG. 7, when the output line OLi is periodically floated as in the comparative example, intermodulation noise occurs in the communication band of the antenna module 1006. In comparison, in the embodiment of the present disclosure (FIG. 4 and FIG. 5), the output line OLi is always connected to an amplifier Amp1 or Amp2, and accordingly, intermodulation noise in the communication band of the antenna module 1006 may be minimized.

Figure 8:
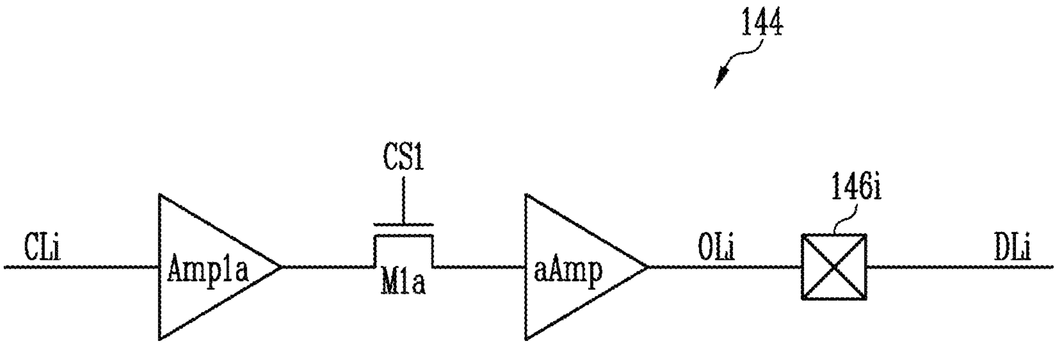
FIG. 8 illustrates an example of an output portion shown in FIG. 3.

FIG. 8 illustrates an example of the output portion 144 shown in FIG. 3. FIG. 8 illustrates the i-th channel of the output portion 144. Configurations of other channels included in the output portion 144 may also be substantially the same as the i-th channel.

Referring to FIG. 8, the channel of the output portion 144 may include a first amplifier Amp1*a*, a first transistor M1*a*, and an auxiliary amplifier aAmp. The first amplifier Amp1*a*, the first transistor M1*a*, and the auxiliary amplifier aAmp may be connected in series between the i-th channel line CLi and the i-th output line OLi.

In the embodiment, an input terminal of the first amplifier Amp1*a* may be connected to the i-th channel line CLi. In the embodiment, an output terminal of the auxiliary amplifier aAmp may be connected to the i-th output line OLi. The first transistor M1*a* may be connected between an output terminal of the first amplifier Amp1*a* and an input terminal of the auxiliary amplifier aAmp. The first transistor M1*a* may be turned on when the first control signal CS1 is supplied and turned off when the first control signal CS1 is not supplied.

For example, the first transistor M1*a* may be turned on during the eleventh period T11 shown in FIG. 6 and turned off during the twelfth period T12. The first amplifier Amp1*a* may output a data signal during the eleventh period T11 and be pre-charged during the twelfth period T12. The auxiliary amplifier aAmp may receive a data signal from the first amplifier Amp1*a* during the eleventh period T11 and output the received data signal to the output line OLi.

In the embodiment of the present disclosure described above, the output line OLi may always be electrically connected to the auxiliary amplifier aAmp. In this way, when the output line OLi is always electrically connected to the auxiliary amplifier aAmp, intermodulation noise in the communication band of the antenna module 1006 may be minimized.

Meanwhile, in the embodiment of FIG. 8, the auxiliary amplifier aAmp outputs a data signal without pre-charging. In this case, when the display device 100 is driven at a high driving frequency (or when the horizontal period H is shortened), a data signal of a desired voltage may not be supplied to the pixels PX.

Accordingly, the embodiment of FIG. 8 may be applied when the display device 100 is driven at a low driving frequency and a data signal of sufficient voltage is supplied to the pixels PX via the auxiliary amplifier aAmp. In the embodiment, the display device 100 including the output portion 144 according to the embodiment of FIG. 8 may be experimentally determined.

Figure 9:
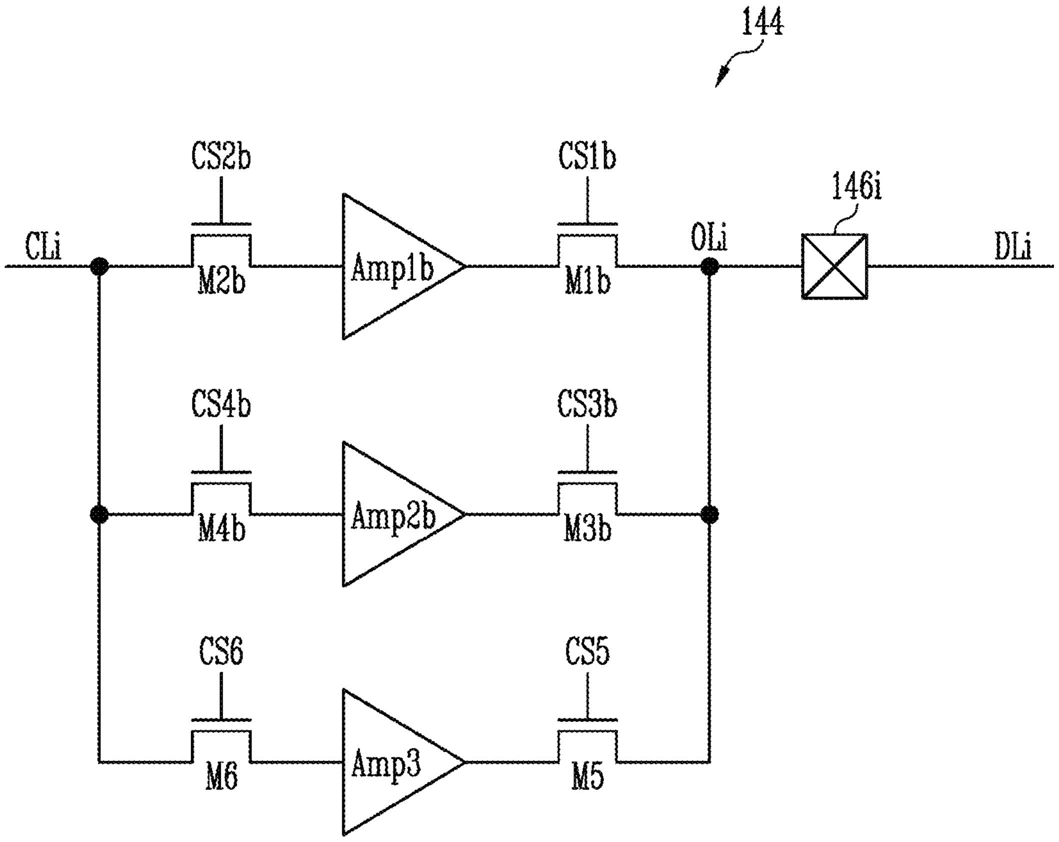
FIG. 9 illustrates an example of an output portion shown in FIG. 3.

FIG. 9 illustrates an example of the output portion 144 shown in FIG. 3. In FIG. 9, an i-th channel, where i is an integer greater than or equal to 0, of the output portion 144 is shown. Configurations of other channels included in the output portion 144 may also be substantially the same as the i-th channel.

Referring to FIG. 9, the output portion 144 may include a first transistor M1*b*, a second transistor M2*b*, a third transistor M3*b*, a fourth transistor M4*b*, a fifth transistor M5, a sixth transistor M6, a first amplifier Amp1*b*, a second amplifier Amp2*b*, and a third amplifier Amp3.

The first transistor M1*b* to the sixth transistor M6 may be turned on when control signals CS1*b*, CS2*b*, CS3*b*, CS4*b*, CS5, and CS6 are supplied and turned off when the control signals CS1*b*, CS2*b*, CS3*b*, CS4*b*, CS5, and CS6 are not supplied. Here, supplying the control signals CS1*b* to CS6 means that the gate-on voltage is supplied to the gate electrodes of the transistors M1*b* to M6, and not supplying the control signals CS1*b* to CS6 means that the gate-off voltage is supplied to the gate electrodes of the transistors M1*b* to M6.

The first transistor M1*b* may be connected between the i-th output line OLi and the first amplifier Amp1*b*. The first transistor M1*b* may be turned on when the first control signal CS1*b* is supplied, and may be turned off when first control signal CS1*b* is not supplied.

The second transistor M2*b* may be connected between the i-th channel line CLi and the first amplifier Amp1*b*. The second transistor M2*b* may be turned on when the second control signal CS2*b* is supplied, and may be turned off when the second control signal CS2*b* is not supplied.

An input terminal of the first amplifier Amp1*b* may be connected to the second transistor M2*b*, and an output terminal of the first amplifier Amp1*b* may be connected to the first transistor M1*b*. The first amplifier Amp1*b* may supply a data signal to the i-th data line DLi (or the i-th output line OLi).

The third transistor M3*b* may be connected between the i-th output line OLi and the second amplifier Amp2*b*. The third transistor M3*b* may be turned on when the third control signal CS3*b* is supplied and turned off when the third control signal CS3*b* is not supplied.

The fourth transistor M4*b* may be connected between the i-th channel line CLi and the second amplifier Amp2*b*. The fourth transistor M4*b* may be turned on when the fourth control signal CS4*b* is supplied and turned off when the fourth control signal CS4*b* is not supplied.

An input terminal of the second amplifier Amp2*b* may be connected to the fourth transistor M4*b*, and an output terminal thereof may be connected to the third transistor M3*b*. The second amplifier Amp2*b* may supply a data signal to the i-th data line DLi (or the i-th output line OLi).

The fifth transistor M5 may be connected between the i-th output line OLi and the third amplifier Amp3. The fifth transistor M5 may be turned on when the fifth control signal CS5 is supplied and turned off when the fifth control signal CS5 is not supplied.

The sixth transistor M6 may be connected between the i-th channel line CLi and the third amplifier Amp3. The sixth transistor M6 may be turned on when the sixth control signal CS6 is supplied and turned off when the sixth control signal CS6 is not supplied.

An input terminal of the third amplifier Amp3 may be connected to the sixth transistor M6, and an output terminal thereof may be connected to the fifth transistor M5. The third amplifier Amp3 may supply a data signal to the i-th data line DLi (or the i-th output line OLi).

The first transistor M1*b*, the first amplifier Amp1*b*, and the second transistor M2*b* may be connected in series between the i-th channel line CLi and th i-th output line OLi. The third transistor M3*b*, the second amplifier Amp2*b*, and the fourth transistor M4*b* may be connected in series between the i-th channel line CLi and the i-th output line OLi. The fifth transistor M5, the third amplifier Amp3, and the sixth transistor M6 may be connected in series between the i-th channel line CLi and the i-th output line OLi.

The third transistor M3*b*, the second amplifier Amp2*b*, and the fourth transistor M4*b* may be connected in parallel to the first transistor M1*b*, the first amplifier Amp1*b*, and the second transistor M2*b* between the i-th channel line CLi and the i-th output line OLi. The fifth transistor M5, the third amplifier Amp3, and the sixth transistor M6 may be connected in parallel to the first transistor M1*b*, the first amplifier Amp1*b*, and the second transistor M2*b* between the i-th channel line CLi and the i-th output line OLi.

In the embodiment, the first amplifier Amp1*b*, the second amplifier Amp2*b*, and the third amplifier Amp3 may alternately supply data signals to the i-th data line DLi. For example, the amplifiers Amp1*b*, Amp2*b*, and Amp3 electrically connected to the i-th output line OLi may be set differently for each horizontal period. In the embodiment, the first amplifier Amp1*b*, the second amplifier Amp2*b*, and the third amplifier Amp3 may be sequentially electrically connected to the i-th output line OLi.

Figure 10:
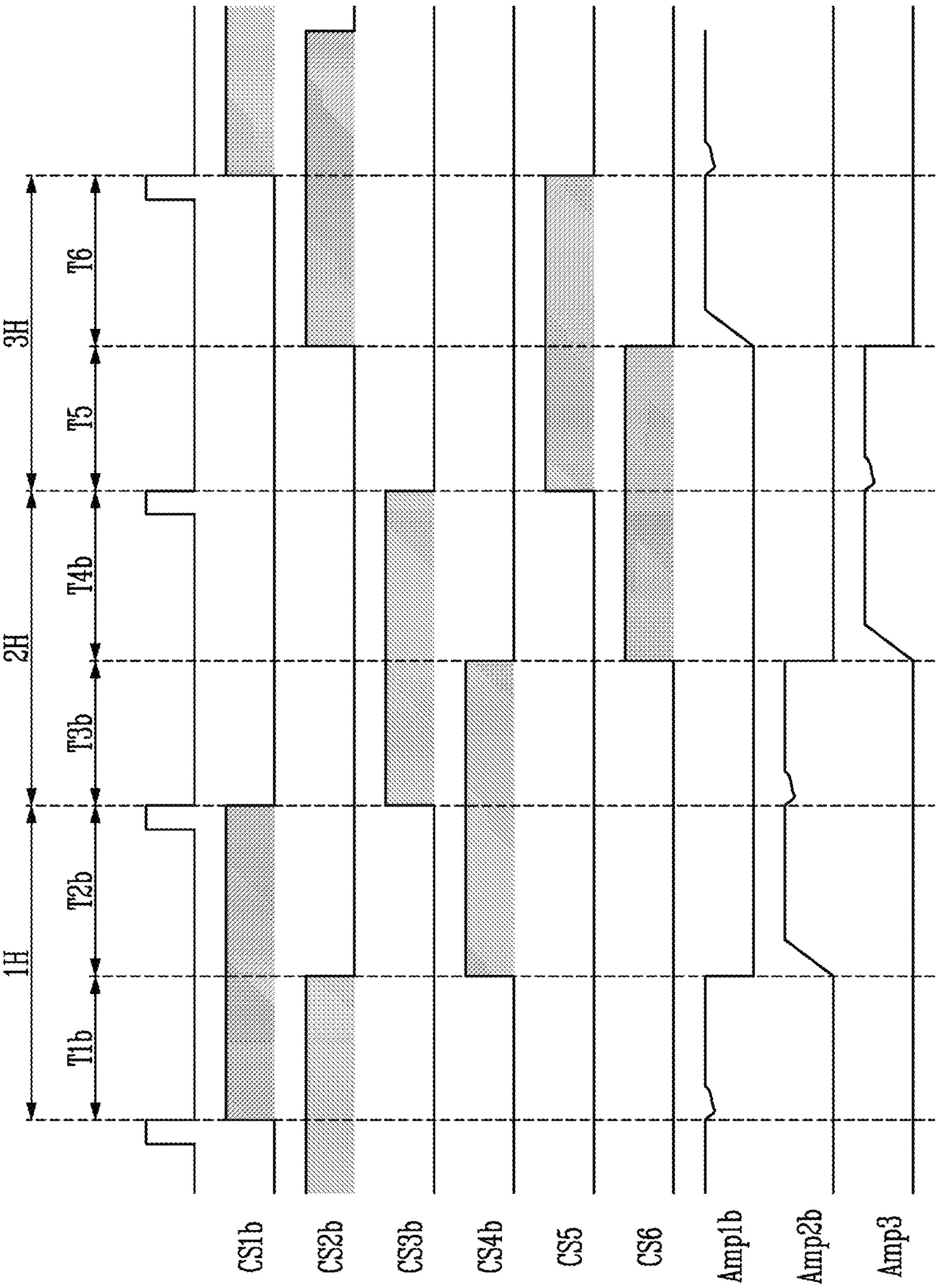
FIG. 10 illustrates an example of a driving method of the output portion shown in FIG. 9.

FIG. 10 illustrates an example of a driving method of the output portion 144 shown in FIG. 9.

Referring to FIG. 10, in the first horizontal period 1H of three adjacent horizontal periods 1H, 2H, and 3H, a data signal may be supplied from the first amplifier Amp1*b* to the data line DLi, in the second horizontal period 2H thereof, a data signal may be supplied from the second amplifier Amp2*b* to the data line DLi, and in the third horizontal period 3H thereof, a data signal may be supplied from the third amplifier Amp3 to the data line DLi.

During a first period T1*b* of the first horizontal period 1H, the second control signal CS2*b* may be supplied to turn on the second transistor M2*b*. The second transistor M2*b* may maintain a turned-on state even during a horizontal period prior to the first horizontal period 1H. When the second transistor M2*b* is turned on, the first amplifier Amp1*b* may be pre-charged.

During the first period T1*b* and a second period T2*b* of the first horizontal period 1H, the first control signal CS1*b* may be supplied to turn on the first transistor M1*b*. When the first transistor M1*b* is turned on, the first amplifier Amp1*b* may be electrically connected to the data line DLi via the first transistor M1*b*, the output line OLi, and the junction 146*i*. In this case, the first amplifier Amp1*b* may supply the data signal to the data line DLi.

Meanwhile, during the second period T2*b*, the fourth control signal CS4*b* may be supplied to turn on the fourth transistor M4*b*. When the fourth transistor M4*b* is turned on, the second amplifier Amp2*b* may be pre-charged by the voltage from the channel line CLi. That is, the second amplifier Amp2*b* is pre-charged before supplying the data signal to the data line DLi, and accordingly, the data signal voltage may be stably outputted.

During a third period T3*b* and a fourth period T4*b* of the second horizontal period 2H, the third control signal CS3*b* may be supplied to turn on the third transistor M3*b*. When the third transistor M3*b* is turned on, the second amplifier Amp2*b* may be electrically connected to the data line DLi via the third transistor M3*b*, the output line OLi, and the junction 146*i*. In this case, the second amplifier Amp2*b* may supply the data signal to the data line DLi.

During the fourth period T4*b* of the second horizontal period 2H, the sixth control signal CS6 is supplied to turn on the sixth transistor M6. When the sixth transistor M6 is turned on, the third amplifier Amp3 may be pre-charged by the voltage from the channel line CLi. That is, the third amplifier Amp3 is pre-charged before supplying the data signal to the data line DLi, and accordingly, the data signal voltage may be stably outputted.

During a fifth period T5 and a sixth period T6 of the third horizontal period 3H, the fifth control signal CS5 may be supplied to turn on the fifth transistor M5. When the fifth transistor M5 is turned on, the third amplifier Amp3 may be electrically connected to the data line DLi via the fifth transistor M5, the output line OLi, and the junction 146*i*. In this case, the third amplifier Amp3 may supply the data signal to the data line DLi.

During the sixth period T6 of the third horizontal period 3H, the second control signal CS2*b* is supplied to turn on the second transistor M2*b*. When the second transistor M2*b* is turned on, the first amplifier Amp1*b* may be pre-charged by the voltage from the channel line CLi. That is, the first amplifier Amp1*b* is pre-charged before supplying the data signal to the data line DLi, and accordingly, the data signal voltage may be stably outputted.

In fact, the first amplifier Amp1*b*, the second amplifier Amp2*b*, and the third amplifier Amp3 included in each channel of the output portion 144 may supply the data signal to the data line (one data line of the data lines DL1 to DLm) while repeating the above-described process.

The turned-on periods of the first transistor M1*b*, the third transistor M3*b*, and the fifth transistor M5 do not overlap. For example, the first transistor M1*b*, the third transistor M3*b*, and the fifth transistor M5 may be turned on in different horizontal periods. For example, the first transistor M1*b* may be turned on in the first horizontal period 1H, the third transistor M3*b* may be turned on in the second horizontal period 2H, and the fifth transistor M5 may be turned on in the third horizontal period 3H.

The turned-on periods of the second transistor M2*b*, the fourth transistor M4*b*, and the sixth transistor M6 do not overlap. The second transistor M2*b* is turned on before the first transistor M1*b*, and a turned-on period of the second transistor M2*b* may partially overlap a turned-on period of the first transistor M1*b*. The fourth transistor M4*b* is turned on before the third transistor M3*b*, and a turned-on period of the fourth transistor M4*b* may partially overlap a turned-on period of the third transistor M3*b*. The sixth transistor M6 is turned on before the fifth transistor M5, and a turned-on period of the sixth transistor M6 may partially overlap a turned-on period of the fifth transistor M5.

Figure 11:
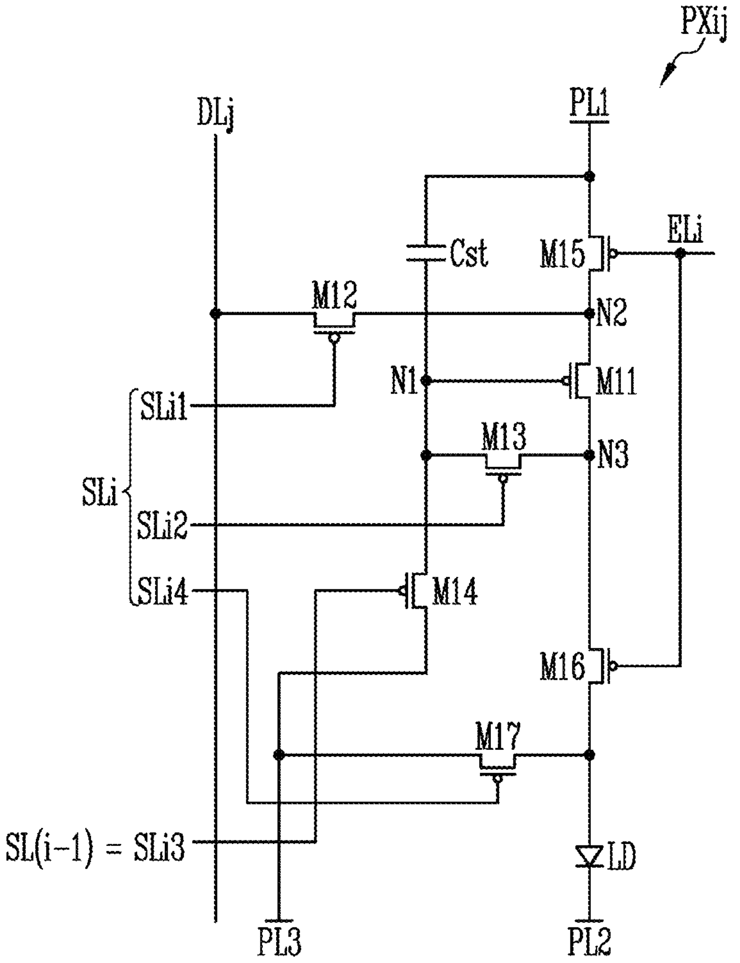
FIG. 11 is a drawing for explaining a pixel according to an embodiment of the present disclosure.

FIG. 11 is a drawing for explaining a pixel PXij according to an embodiment of the present disclosure. FIG. 11 illustrates the pixel PXij connected to an i-th scan line and a j-th data line, where j is an integer greater than or equal to 0.

Referring to FIG. 11, the pixel PXij according to the embodiment of the present disclosure includes transistors M11, M12, M13, M14, M15, M16, and M17, a storage capacitor Cst, and a light emitting element LD.

Hereinafter, a circuit configured of a P-type transistor will be described as an example. However, a person of an ordinary skill in the art, by changing a polarity of a voltage applied to a gate terminal, may design a circuit configured of an N-type transistor. Similarly, a person of an ordinary skill in the art would be able to design a circuit configured of a combination of a P-type of transistor and an N-type of transistor. The transistor may have various kinds such as a thin film transistor (TFT), a field effect transistor (FET), and a bipolar junction transistor (BJT).

In the first transistor M11, a gate electrode may be connected to a first node N1, a first electrode may be connected to a second node N2, and a second electrode may be connected to a third node N3. The first transistor M11 may be referred to as a driving transistor.

In the second transistor M12, a gate electrode may be connected to a scan line SLi1, a first electrode may be connected to a data line DLj, and a second electrode may be connected to the second node N2.

In the third transistor M13, a gate electrode may be connected to a scan line SLi2, a first electrode may be connected to the third node N3, and a second electrode may be connected to the first node N1.

In the fourth transistor M14, a gate electrode may be connected to a scan line SLi3, a first electrode may be connected to the first node N1, and a second electrode may be connected to the third power line PL3.

In the fifth transistor M15, a gate electrode may be connected to the i-th light emitting control line ELi, a first electrode may be connected to the first power line PL1, and a second electrode may be connected to the second node N2. The fifth transistor M15 may be referred to as a light emitting transistor.

In the sixth transistor M16, a gate electrode may be connected to the i-th light emitting control line ELi, a first electrode may be connected to the third node N3, and a second electrode may be connected to an anode of the light emitting element LD. The sixth transistor M16 may be referred to as a light emitting transistor. In an embodiment, the gate electrode of the sixth transistor M16 may be connected to the gate electrode of the fifth transistor M15 and another light emitting control line.

In the seventh transistor M17, a gate electrode may be connected to the scan line SLi4, a first electrode may be connected to the third power line PL3, and a second electrode may be connected to the anode of the light emitting element LD.

A first electrode of the storage capacitor Cst may be connected to the first power line PL1, and a second electrode thereof may be connected to the first node N1.

The anode of the light emitting element LD may be connected to the second electrode of the sixth transistor M16, and a cathode thereof may be connected to the second power line PL2. The light emitting element LD may be a light emitting diode. The light emitting element LD may include an organic light emitting diode, an inorganic light emitting diode, and a quantum dot/well light emitting diode. In addition, in the present embodiment, only one light emitting element LD is provided in each pixel, but in an embodiment, a plurality of light emitting elements may be provided in each pixel. In this case, the plurality of light emitting elements may be connected in series, in parallel, or in series/parallel.

The voltage of the first driving power source VDD may be applied to the first power line PL1, the voltage of the second driving power source VSS may be applied to the second power line PL2, and the voltage of the initialization power source Vint may be applied to the third power line PL3. For example, the first driving power source VDD may have a higher voltage than the second driving power source VSS. For example, the initialization power source Vint may have the same voltage as or a higher voltage than the second driving power source VSS. For example, the initialization power source Vint may have a voltage lower than a voltage of the data signal.

Figure 12:
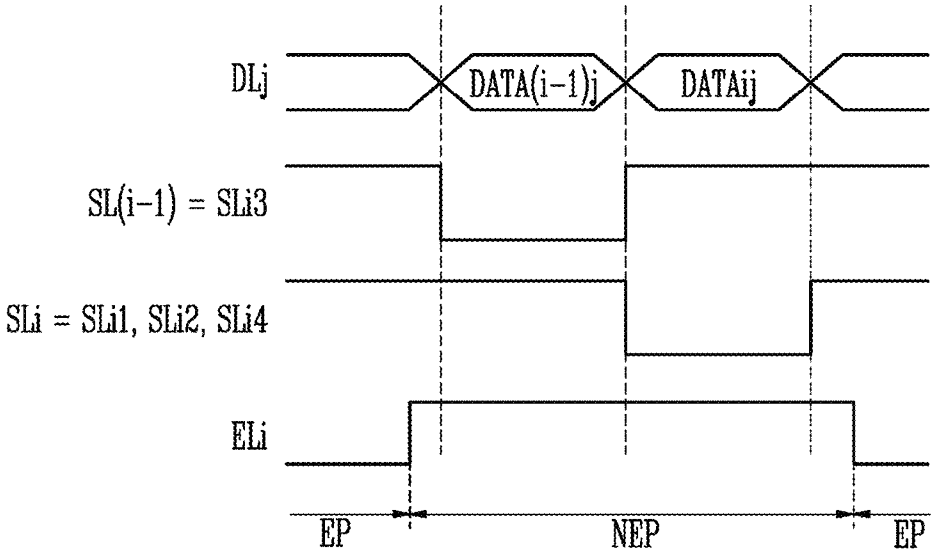
FIG. 12 is a drawing for explaining an example driving method of the pixel shown in FIG. 11.

FIG. 12 is a drawing for explaining an example driving method of the pixel PXij shown in FIG. 11.

Hereinafter, for better understanding and ease of description, it is assumed that the scan lines SLi1, SLi2, and SLi4 are i-th scan lines SLi, and the scan line SLi3 is an (i−1)-th scan line SL (i−1). However, the scan lines SLi1, SLi2, SLi3, and SLi4 may have various connection relationships according to embodiments. For example, the scan line SLi4 may be the (i−1)-th scan line or the (i+1)-th scan line.

First, a light emitting control signal having a turn-off level (logic high level) is applied to the i-th light emitting control line ELi, a data signal DATA (i−1) j for an (i−1)-th pixel is applied to the data line DLj, and a scan signal having a turn-on level (logic low level) is applied to the scan line SLi3. The logic high or low level may vary depending on whether the transistor is a P-type or N-type transistor.

In this case, since the scan signal having a turn-off level is applied to the scan lines SLi1 and SLi2, the second transistor M12 is in a turn-off state, and prevents the data signal DATA (i−1) j for the (i−1)-th pixel to be inputted to the pixel PXij.

In this case, since the fourth transistor M14 is in a turned-on state, the first node N1 is connected to the third power line PL3, so that a voltage of the first node N1 is initialized. Since the light emitting control signal having a turn-off level is applied to the light emitting control line ELi, the transistors M15 and M16 are in a turn-off state, and unnecessary light emitting of the light emitting element LD according to the initialization voltage application process is prevented.

Next, the data signal DATAij for the i-th pixel PXij is applied to the data line DLj, and the scan signal having a turn-on level is applied to the scan lines SLi1 and SLi2. Accordingly, the transistors M12, M11, and M13 are turned on, and thus the data line DLj and the first node N1 are electrically connected. Accordingly, a compensation voltage obtained by subtracting a threshold voltage of the first transistor M11 from the data signal DATAij is applied to the second electrode (that is, the first node N1) of the storage capacitor Cst, and the storage capacitor Cst maintains a voltage corresponding to a difference between the voltage of the first driving power source VDD and the compensation voltage. This period may be referred to as a threshold voltage compensation period or data writing period.

In addition, when the scan line SLi4 is the i-th scan line, since the seventh transistor M17 is in a turn-on state, the anode of the light emitting element LD and the third power line PL3 are connected, and the light emitting element LD is initialized with an amount of charge corresponding to a voltage difference between the voltage of the initialization power source Vint and the voltage of the second driving power source VSS.

Thereafter, as the light emitting control signal having a turn-on level is applied to the i-th light emitting control line ELi, the transistors M15 and M16 may be turned on. Accordingly, a current path connecting the first power line PL1, the fifth transistor M15, the first transistor M11, the sixth transistor M16, the light emitting element LD, and the second power line PL2 is formed.

An amount of driving current flowing through the first and second electrodes of the first transistor M11 is adjusted according to a voltage maintained in the storage capacitor Cst. The light emitting element LD emits light with a luminance corresponding to the amount of driving current. The light emitting element LD emits light until a light emitting control signal of a turn-off level is applied to the light emitting control line ELi.

When the light emitting control signal is at a turn-on level, the pixels PX receiving the corresponding light emitting control signal may be in a display state. Accordingly, a period in which the light emitting control signal is at the turned-on level may be referred to as a light emitting period EP (or a light emitting permissive period). In addition, when the light emitting control signal is at a turn-off level, the pixels PX receiving the corresponding light emitting control signal may be in a non-display state. Accordingly, a period in which the light emitting control signal is at the turned-off level may be referred to as a non-light emitting period NEP (or a light emitting non-permissive period).

The non-light emitting period NEP described in FIG. 12 is to prevent the pixel PXij from emitting light with undesired luminance during the initialization period and the data writing period.

While the data signal written in the pixel PXij is maintained (for example, one frame period), one or more non-light emitting periods NEP may be additionally provided. This may be to effectively express a low gray level by reducing the light emitting period EP of the pixel PXij, or to smoothly blur the motion of an image.

Figure 13:
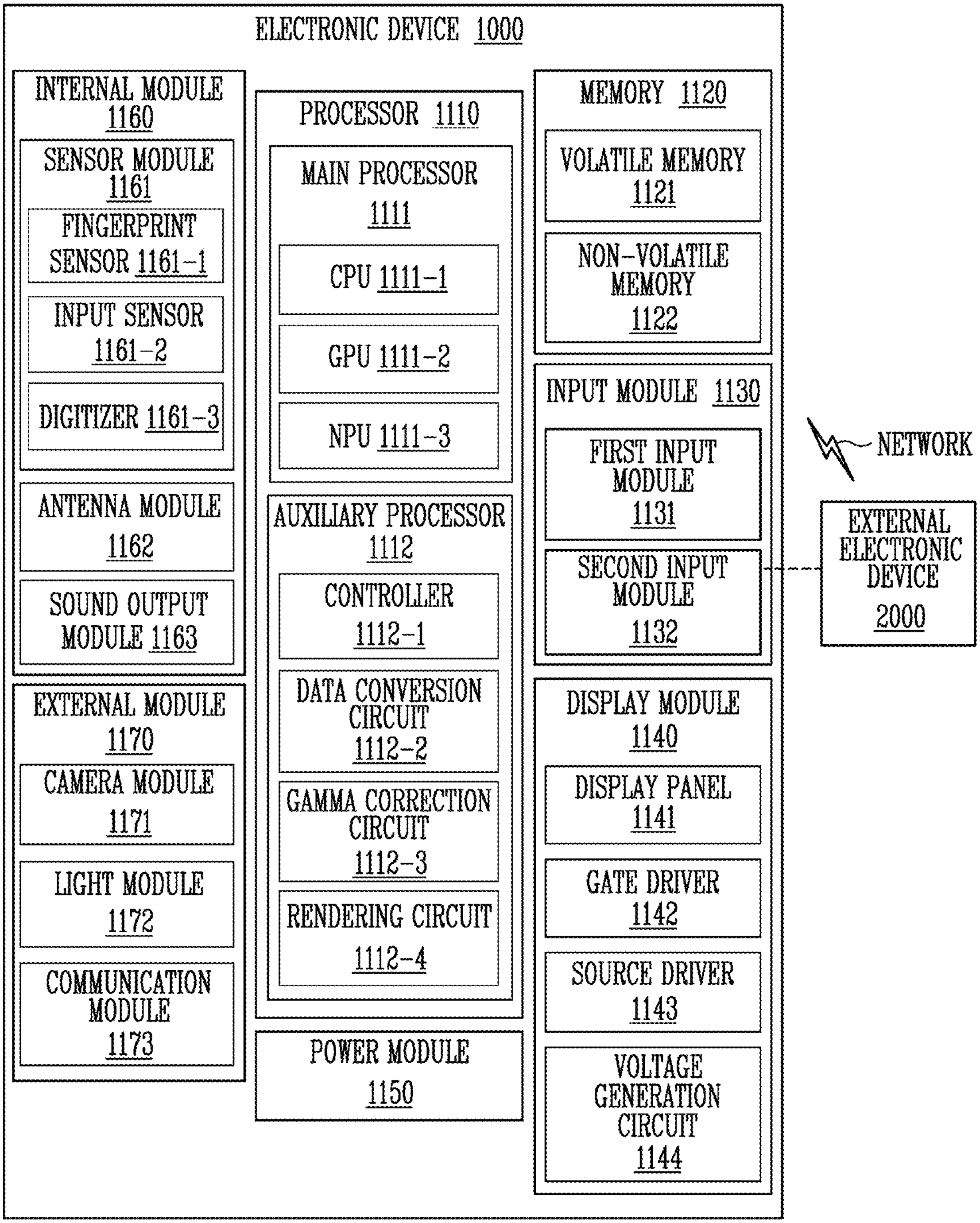
FIG. 13 illustrates an electronic device according to an embodiment of the present disclosure.

FIG. 13 illustrates an electronic device 1000 according to an embodiment of the present disclosure.

Referring to FIG. 13, the electronic device 1000 according to an embodiment outputs various information through a display module 1140. When a processor 1110 executes an application stored in a memory 1120, the display module 1140 provides application information to a user through a display panel 1141.

The processor 1110 obtains external input through an input module 1130 or a sensor module 1161 and executes an application corresponding to the external input. For example, when the user selects a camera icon (or a camera application icon) displayed on the display panel 1141, the processor 1110 obtains user input through an input sensor 1161-2 and activates the camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains inputted fingerprint information as input data. The processor 1110 compares the inputted data obtained through the fingerprint sensor 1161-1 with authentication data stored in the memory 1120, and executes an application according to the compared result. The display module 1140 may display information executed according to application logic through the display panel 1141. The fingerprint sensor 1161-1 may be disposed so that fingerprint information may be obtained from the entire area of the display module 1140 (or display panel 1141).

As another example, when a music streaming icon displayed on the display module 1140 is selected, the processor 1110 obtains user input through the input sensor 1161-2 and activates a music streaming application stored in the memory 1120. When a music execution instruction is inputted from the music streaming application, the processor 1110 activates a sound output module 1163 to provide sound information corresponding to the music execution instruction to the user.

In the above, the operation of the electronic device 1000 has been briefly described. Hereinafter, a configuration of the electronic device 1000 will be described in detail. Some of components of the electronic device 1000 to be described later may be integrated and provided as one component, and one component thereof may be divided and provided as two or more components.

The electronic device 1000 may communicate with an external electronic device 2000 through a network (for example, a short range wireless communication network or a long range wireless communication network). According to the embodiment, the electronic device 1000 may include the processor 1110, the memory 1120, the input module 1130, the display module 1140, a power module 1150, an internal module 1160, and an external module 1170. According to the embodiment, in the electronic device 1000, at least one of the aforementioned constituent elements may be omitted, or one or more other constituent elements may be added. According to an embodiment, some (for example, the sensor module 1161, an antenna module 1162, or the sound output module 1163) of the aforementioned constituent elements may be integrated into another constituent element (for example, the display module 1140).

The processor 1110 may execute software to control at least one other constituent element (for example, a hardware or software constituent element) of the electronic device 1000 connected to the processor 1110, and may perform various data processing or calculations. According to the embodiment, as at least some of the data processing or operation, the processor 1110 may store an instruction or data received from other constituent element (for example, the input module 1130, the sensor module 1161, or a communication module 1173) in a volatile memory 1121, may process the instructions or data stored in the volatile memory 1121, and may store the result data in a non-volatile memory 1122.

The processor 1110 may include a main processor 1111 and an auxiliary processor 1112. The main processor 1111 may include one or more of a central processing unit (CPU) 1111-1 and an application processor (AP). The main processor 1111 may further include one or more of a graphic processing unit (GPU) 1111-2, a communication processor (CP), and an image signal processor (ISP). The main processor 1111 may further include a neural processing unit (NPU) 1111-3. The neural processing unit 1111-3 is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, and a combination of two or more thereof, but is not limited to the above example. The artificial intelligence models may additionally or alternatively include a software structure in addition to the hardware structure thereof. At least two of the aforementioned processing units and processors may be implemented as an integrated component (for example, a single chip), or each thereof may be implemented as an independent component (for example, a plurality of chips).

The auxiliary processor 1112 may include a controller 1112-1. The controller 1112-1 may include an interface conversion circuit and a timing control circuit. For example, the controller 1112-1 may include the timing controller 120 shown in FIG. 1. The controller 1112-1 receives an image signal from the main processor 1111, and converts a data format of the image signal to meet an interface specification with the display module 1140 to output image data. The controller 1112-1 may output various control signals necessary for driving the display module 1140.

The auxiliary processor 1112 may further include a data conversion circuit 1112-2, a gamma correction circuit 1112-3, a rendering circuit 1112-4, and a touch control circuit not shown. The data conversion circuit 1112-2 may receive image data from the controller 1112-1, and it may compensate the image data to display the image with a desired luminance according to characteristics of the electronic device 1000 or a user's setting, or convert the image data to reduce power consumption or compensate for an afterimage.

The gamma correction circuit 1112-3 may convert the image data or gamma reference voltage so that the image displayed on the electronic device 1000 has a desired gamma characteristic. The rendering circuit 1112-4 may receive image data from the controller 1112-1, and render the image data in consideration of pixel disposition of the display panel 1141 applied to the electronic device 1000.

The touch control circuit may supply a touch signal to the input sensor 1161-2, and may receive a sensing signal from the input sensor 1161-2 in response to the touch signal.

At least one of the data conversion circuit 1112-2, the gamma correction circuit 1112-3, the rendering circuit 1112-4, and the touch control circuit may be incorporated into another constituent element (for example, the main processor 1111 or the controller 1112-1). At least one of the data conversion circuit 1112-2, the gamma correction circuit 1112-3, and the rendering circuit 1112-4 may be integrated into a source driver 1143 to be described later.

The memory 1120 may store various data used by at least one constituent element (for example, the processor 1110 or the sensor module 1161) of the electronic device 1000, and input data or output data for an instruction related thereto. In addition, various setting data corresponding to the user's setting may be stored in the memory 1120. The memory 1120 may include at least one or more of the volatile memory 1121 and the non-volatile memory 1122.

The input module 1130 may receive an instruction or data to be used for a constituent element (for example, the processor 1110, the sensor module 1161, or the sound output module 1163) of the electronic device 1000 from the outside of the electronic device 1000 (for example, a user or the external electronic device 2000).

The input module 1130 may include a first input module 1131 to which an instruction or data is inputted from a user and a second input module 1132 to which an instruction or data is inputted from the external electronic device 2000. The first input module 1131 may include a microphone, a mouse, a keyboard, a key (for example, a button), or a pen (for example, a passive pen or active pen). The second input module 1132 may support a designated protocol that may be connected to the external electronic device 2000 by wire or wirelessly. According to the embodiment, the second input module 1132 may include a high definition multimedia interface (HDMI), a universal serial bus (USB) interface, an SD card interface, or an audio interface. The second input module 1132 may include a connector that may be physically connected to the external electronic device 2000, for example, an HDMI connector, a USB connector, an SD card connector, or an audio connector (for example, a headphone connector).

The display module 1140 visually provides information to the user. The display module 1140 may include the display panel 1141, a gate driver 1142, and the source driver 1143. The display module 1140 may further include the window 190 (see FIG. 2), a chassis, and a bracket to protect the display panel 1141. The display module 1140 may include the display device 100 shown in FIG. 1.

The display panel 1141 (or a display) may include a liquid crystal display panel, an organic light emitting display panel, or an inorganic light emitting display panel, and the type of display panel 1141 is not particularly limited. The display panel 1141 may be a rigid type, or a flexible type that may be rolled or folded. The display module 1140 may further include a supporter, a bracket, or a heat dissipation member for supporting the display panel 1141. The display panel 1141 may include the pixel portion 110 shown in FIG. 1 and/or the panel 170 shown in FIG. 2.

The gate driver 1142 may be mounted on the display panel 1141 as a driving chip. In addition, the gate driver 1142 may be integrated in the display panel 1141. For example, the gate driver 1142 includes an amorphous silicon TFT gate driver circuit (ASG), a low temperature polycrystalline silicon (LTPS) TFT gate driver circuit, or an oxide semiconductor TFT gate driver circuit (OSG) that is embedded in the display panel 1141. The gate driver 1142 receives a control signal from the controller 1112-1, and outputs scan signals to the display panel 1141 in response to the control signal. The gate driver 1142 may include the scan driver 130 shown in FIG. 1.

The display module 1140 may further include a light emitting driver. The light emitting driver outputs a light emitting control signal to the display panel 1141 in response to the control signal received from the controller 1112-1. The light emitting driver may be formed separately from the gate driver 1142, or may be integrated in the gate driver 1142. The light emitting driver may include the light emitting driver 150 shown in FIG. 1.

The source driver 1143 receives a control signal from the controller 1112-1, converts image data into an analog voltage (for example, a data signal) in response to the control signal, and then outputs data signals to the display panel 1141. The source driver 1143 may include the data driver 140 shown in FIG. 1.

That is, the source driver 1143 may include the signal generator 142 and the output portion 144 shown in FIG. 3. Each channel of the output portion 144 included in the source driver 1143 may include one of the configurations of FIG. 4, FIG. 8, or FIG. 9. Each channel of the output portion 144 may output a data signal.

The source driver 1143 may be incorporated into other constituent elements (for example, the controller 1112-1). The functions of the interface conversion circuit and the timing control circuit of the controller 1112-1 described above may be integrated into the source driver 1143.

The display module 1140 may further include a voltage generation circuit 1144. The voltage generation circuit 1144 may output various voltages necessary for driving the display panel 1141. For example, the voltage generation circuit 1144 may include the power supply 160 shown in FIG. 1.

In the embodiment, the display panel 1141 may include a plurality of pixel arrays each including a plurality of pixels.

In the embodiment, the source driver 1143 may convert data corresponding to red (R), green (G), and blue (B) included in the image data received from the processor 1110 into a red data signal (or data voltage), a green data signal, and a blue data signal to provide them to the plurality of pixel arrays included in the display panel 1141 during one horizontal period.

The power module 1150 supplies power to the constituent elements of the electronic device 1000. The power module 1150 may include a battery in which a power voltage is charged. The battery may include a non-rechargeable primary battery, or a rechargeable battery or fuel cell. The power module 1150 may include a power management integrated circuit (PMIC). The PMIC supplies optimized power to each of the above-described modules and modules to be described later. The power module 1150 may include a wireless power transmission/reception member electrically connected to a battery. The wireless power transmission/reception member may include a plurality of antenna radiators in a form of a coil.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense input by a user's body or input by the pen among the first input module 1131, and may generate an electrical signal or a data value corresponding to the input. The sensor module 1161 may include at least one or more of the fingerprint sensor 1161-1, the input sensor 1161-2, and a digitizer 1161-3.

The fingerprint sensor 1161-1 may generate a data value corresponding to a user's fingerprint. The fingerprint sensor 1161-1 may include either an optical type or a capacitive type fingerprint sensor.

The input sensor 1161-2 may generate a data value corresponding to coordinate information of input by the user's body or input by the pen. The input sensor 1161-2 generates an amount of change in capacitance by the input as a data value. The input sensor 1161-2 may sense input by the passive pen, or may transmit/receive data with the active pen.

The input sensor 1161-2 may measure a biosignal such as blood pressure, water, or body fat. For example, when the user touches a part of the body to the sensor layer or the sensing panel and does not move for a certain period of time, based on a change in an electric field by the part of the body, the input sensor 1161-2 may sense a biosignal and output desired information to the display module 1140.

The digitizer 1161-3 may generate a data value corresponding to coordinate information of a pen input. The digitizer 1161-3 generates an electromagnetic change amount by the input as a data value. The digitizer 1161-3 may sense input by the passive pen, or may transmit/receive data with the active pen.

At least one of the fingerprint sensor 1161-1, the input sensor 1161-2, and the digitizer 1161-3 may be implemented as a sensor layer formed on the display panel 1141 through a continuous process. At least one of the fingerprint sensor 1161-1, the input sensor 1161-2, and the digitizer 1161-3 may be disposed at an upper side of the display panel 1141, and one of the fingerprint sensor 1161-1, the input sensor 1161-2, and the digitizer 1161-3, for example, the digitizer 1161-3 may be disposed at a lower side of the display panel 1141.

At least two or more of the fingerprint sensor 1161-1, the input sensor 1161-2, and the digitizer 1161-3 may be formed to be integrated into one sensing panel through the same process. When integrated into one sensing panel, the sensing panel may be disposed between the display panel 1141 and a window disposed at an upper side of the display panel 1141. According to the embodiment, the sensing panel may be disposed on the window, and the position of the sensing panel is not particularly limited.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through the process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting or receiving a signal or power to or from the outside. According to the embodiment, the communication module 1173 may transmit a signal to an external electronic device or receive a signal from an external electronic device through an antenna suitable for a communication method. An antenna pattern of the antenna module 1162 may be integrated into one component (for example, the display panel 1141) of the display module 1140 or the input sensor 1161-2. The antenna module 1162 may be the antenna module 1006 shown in FIG. 2.

The sound output module 1163 is a device for outputting a sound signal to the outside of the electronic device 1000, and may include, for example, a speaker used for general purposes such as multimedia playback or recording playback, and a receiver used exclusively for receiving calls. According to the embodiment, the receiver may be provided integrally with or separately from the speaker. A sound output pattern of the sound output module 1163 may be integrated into the display module 1140.

The camera module 1171 may capture still images and moving images. According to the embodiment, the camera module 1171 may include one or more lenses, image sensors, or image signal processors. The camera module 1171 may further include an infrared camera capable of measuring the presence or absence of the user, the position of the user, and the gaze of the user.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000, and communication through the established communication channel. The communication module 1173 may include one or both of a wireless communication module, such as a cellular communication module, a short range communication module, or a global navigation satellite system (GNSS) communication module and a wired communication module such as a local area network (LAN) communication module or a power line communication module. The communication module 1173 may communicate with the external electronic device 2000 through a short range communication network such as Bluetooth, WiFi direct, or infrared data association (IrDA) or a long range communication network such as a cellular network, the Internet, or a computer network (for example, LAN or WAN). The various types of the communication modules 1173 described above may be implemented as a single chip or may be implemented as separate chips.

The input module 1130, the sensor module 1161, the camera module 1171, and the like may be used to control an operation of the display module 1140 in conjunction with the processor 1110.

The processor 1110 outputs an instruction or data to the display module 1140, the sound output module 1163, the camera module 1171, or the light module 1172 based on input data received from the input module 1130. For example, the processor 1110 may generate image data in response to input data applied through a mouse or an active pen to output it to the display module 1140, or may generate instruction data in response to the input data to output it to the camera module 1171 or light module 1172. When input data is not received from the input module 1130, the processor 1110 may reduce power consumed by the electronic device 1000 by changing an operation mode of the electronic device 1000 to a low power mode or a sleep mode.

The processor 1110 outputs an instruction or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to the compared result. The processor 1110 may execute an instruction based on sensed data sensed by the input sensor 1161-2 or the digitizer 1161-3, or may output corresponding image data to the display module 1140. When the sensor module 1161 includes a temperature sensor, the processor 1110 may receive temperature data for a measured temperature from the sensor module 1161, and may further perform luminance correction on image data based on the temperature data.

The processor 1110 may receive measurement data about the presence of a user, a user's position, a user's gaze, and the like, from the camera module 1171. The processor 1110 may further perform luminance correction and the like on image data based on the measurement data. For example, the processor 1110 that determines the presence of a user through an input from the camera module 1171 may output image data whose luminance is corrected through the data conversion circuit 1112-2 or the gamma correction circuit 1112-3 to the display module 1140.

Some of the above constituent elements may be connected to each other through a communication method between peripheral devices, for example, a bus, a general purpose input/output (GPIO), a serial peripheral interface (SPI), a mobile industry processor interface (MIPI), or an ultra path interconnect (UPI) link to exchange a signal (for example, an instruction or data) with each other. The processor 1110 may communicate with the display module 1140 through a mutually agreed interface, for example, may use one of the above-described communication methods, and is not limited to the above-described communication methods.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A display device comprising:

pixels disposed to be connected to scan lines and data lines; and a data driver configured to supply a data signal to the data lines via output lines, wherein the data driver includes:

a signal generator configured to generate the data signal to supply the data signal to channel lines;

a plurality of amplifiers comprising a first amplifier and a second amplifier connected in parallel between each of the channel lines and each of the output lines, the output lines always being connected to alternative ones of the amplifiers, wherein the first amplifier and the second amplifier disposed in an i-th channel, where i is an integer greater than or equal to 0, are alternately connected to an i-th output line;

a first transistor connected between the first amplifier and the i-th output line; and a second transistor connected between the first amplifier and an i-th channel line, wherein the second transistor is turned on before the first transistor and stays turned on when the first transistor turns on such that a turned-on period of the second transistor partially overlaps a turned-on period of the first transistor.

2. The display device of claim 1, wherein, the data driver further includes:

a third transistor connected between the second amplifier and the i-th output line; and a fourth transistor connected between the second amplifier and the i-th channel line.

3. The display device of claim 2, wherein, the first transistor and the third transistor are alternately turned on, and the second transistor and the fourth transistor are alternately turned on.

4. The display device of claim 2, wherein, the fourth transistor is turned on before the third transistor, and a turned-on period of the fourth transistor partially overlaps a turned-on period of the third transistor.

5. The display device of claim 1, wherein, the amplifiers further include a third amplifier connected in parallel to the first amplifier and the second amplifier between each of the channel lines and each of the output lines.

6. The display device of claim 5, wherein, the first amplifier, the second amplifier, and the third amplifier disposed in the i-th channel are alternately connected to the i-th output line.

7. The display device of claim 6, wherein, the data driver further includes:

a third transistor connected between the second amplifier and the i-th output line;

a fourth transistor connected between the second amplifier and the i-th channel line;

a fifth transistor connected between the third amplifier and the i-th output line; and a sixth transistor connected between the third amplifier and the i-th channel line.

8. The display device of claim 7, wherein, the first transistor, the third transistor, and the fifth transistor are alternately turned on; and the second transistor, the fourth transistor, and the sixth transistor are alternately turned-on.

9. The display device of claim 7, wherein, the fourth transistor is turned on before the third transistor, and a turned-on period of the fourth transistor partially overlaps a turned-on period of the third transistor; and the sixth transistor is turned on before the fifth transistor, and a turned-on period of the sixth transistor partially overlaps a turned-on period of the fifth transistor.

10. A driving method of a display device, comprising:

generating data signals corresponding to grayscales of data in a signal generator receiving the data; and supplying the data signals to data lines via output lines from an output portion connected to the signal generator, wherein an i-th channel, where i is an integer greater than or equal to 0, of the output portion includes:

a plurality of amplifiers comprising a first amplifier and a second amplifier alternately connected to an i-th output line such that the i-th output line is always connected to alternative ones of the amplifiers;

a first transistor connected between the first amplifier and the i-th output line; and a second transistor connected between the first amplifier and an i-th channel line, wherein the second transistor is turned on before the first transistor and stays turned on when the first transistor turns on such that a turned-on period of the second transistor partially overlaps a turned-on period of the first transistor.

11. The driving method of the display device of claim 10, wherein, the amplifiers are connected to the i-th output line while alternating based on a horizontal period.

12. The driving method of the display device of claim 11, wherein, each of the amplifiers is electrically connected to the i-th output line after being pre-charged by a data signal supplied from the signal generator.

13. An electronic device comprising:

a display module configured to display a predetermined image; and a processor configured to supply data corresponding to the image to the display module, wherein the display module includes:

a display panel displaying the image;

a gate driver configured to supply a scan signal to the display panel; and a source driver configured to supply a data signal to the display panel via output lines, and each channel of the source driver outputting the data signal includes:

a plurality of amplifiers comprising a first amplifier and a second amplifier, the output lines always being connected to alternative ones of the amplifiers, wherein the first amplifier and the second amplifier disposed in an i-th channel, where i is an integer greater than or equal to 0, are alternately connected to an i-th output line;

a first transistor connected between the first amplifier and the i-th output line; and a second transistor connected between the first amplifier and an i-th channel line, wherein the second transistor is turned on before the first transistor and stays turned on when the first transistor turns on such that a turned-on period of the second transistor partially overlaps a turned-on period of the first transistor.

14. The electronic device of claim 13, wherein, the plurality of amplifiers alternately output the data signal.

15. The electronic device of claim 14, wherein, the plurality of amplifiers output the data signal while alternating based on a horizontal period.

* * * * *